United States Patent
Joo et al.

(10) Patent No.: US 7,761,329 B1
(45) Date of Patent: Jul. 20, 2010

(54) ADVERTISING METHOD USING INTERNET E-MAIL

(76) Inventors: Jin-Yong Joo, 201 Artvilla 586 Yangji-dong, Sujeong-ku, Seongnam, Kyonggi-do 461-250 (KR); Yang-Ho Kim, 106-806 Daejin-1cha 339, Jugjohn, Suji-eub, Yongin, Kyonggi-do 449-840 (KR)

( * ) Notice: Subject to any disclaimer, the term of this patent is extended or adjusted under 35 U.S.C. 154(b) by 0 days.

(21) Appl. No.: 09/763,141

(22) PCT Filed: Mar. 29, 2000

(86) PCT No.: PCT/KR00/00280

§ 371 (c)(1),
(2), (4) Date: Jan. 17, 2002

(87) PCT Pub. No.: WO00/58882

PCT Pub. Date: Oct. 5, 2000

(30) Foreign Application Priority Data

Mar. 30, 1999 (KR) .............................. 1999-001105

(51) Int. Cl.
*G06Q 30/00* (2006.01)
(52) U.S. Cl. .................................. 705/14.55; 705/14.73
(58) Field of Classification Search .................. 705/14, 705/14.4, 14.55; 715/200, 804, 962
See application file for complete search history.

(56) References Cited

U.S. PATENT DOCUMENTS

| 5,794,210 A * | 8/1998 | Goldhaber et al. ............ 705/14 |
| 6,205,432 B1 * | 3/2001 | Gabbard et al. ............... 705/14 |
| 2001/0047294 A1 * | 11/2001 | Rothschild .................... 705/14 |

FOREIGN PATENT DOCUMENTS

| JP | 10-312344 | 11/1998 |
| JP | 10-320336 | 12/1998 |
| JP | 11-3072 | 1/1999 |

OTHER PUBLICATIONS

"Viral Marketing" by Steve Jurvetson and Tim Draper—Original version published in the Netscape M-Files, 1997 Edited Version published in Business 2.0, Nov. 1998—www.drapervc.com/ViralMarketing.html.*
Multi-level marketing a rapidly growing trend; [Final Edition] wendy priesnitz. The Record. Kitchener, Ont.: Sep. 11, 1996. p. C.1.FRO.*
Moncur, Michael G., "Sams teach yourself JavaScript 1.3 in 24 hours," Jan. 1999, pp. 161, 195-203, 239-243.*
Wikipedia Entry for "Tooltip", http://en.wikipedia.org/wiki/Tooltip, printed Feb. 3, 2010.*
Wikipedia Entry for "Balloon help", http://en.wikipedia.org/wiki/Balloon_help, printed Feb. 3, 2010.*

* cited by examiner

*Primary Examiner*—Jeffrey D Carlson
(74) *Attorney, Agent, or Firm*—Lowe Hauptman Ham & Berner LLP (57) ABSTRACT

The present invention is related to an advertising method using internet e-mail and chatting window which involves an advertisement in e-mail or chatting window, and compensates the person for seeing the advertisement.

9 Claims, 5 Drawing Sheets

ADVERTISING METHOD USING INTERNET E-MAIL

BACKGROUND OF THE INVENTION

1. Field of the Invention

The present invention relates to an advertising method using Internet electronic mail (e-mail) and chatting services and, in more particular, to an advertising method using Internet e-mail and chatting services, which pays a predetermined charge for viewing advertisements to users when they are provided with Internet e-mail service transmitting e-mails including the advertisements provided by advertisers, to thereby invite and display advertisements.

2. Description of the Related Art

In popularization of the Internet, the amount of advertisements using Internet home pages rapidly increases and markets are being extended. This advertising method using the Internet home pages is to pay a predetermined charge for viewing advertisements to users who sign in specific Internet services whenever advertisements are clicked when the users access the home pages of the Internet services and view the advertisements displayed thereon. This method provides the users with a part of advertising rates paid by their advertisers to secure lots of users who have signed in the services. Additionally, there are extending Internet services which provide free home pages to the users and allow them to use free e-mail accounts on the condition that the users sign in the Internet services and view advertisements displayed on the home pages. This rapidly raises the amount of usage of e-mail.

However, the Internet services described as above provide free services like e-mail services to the users and pay a predetermined charge for clicking the advertisements to them in case where the users view the advertisements displayed on the home pages. Further, the e-mail is used as a means for directly advertising specific products or services when it is employed for advertisements. This causes a flood of spam mails which are delivered to users who do not want them. This problem limits e-mail service and does not allow the e-mail, which has a potential of replacing facsimile service or postal service, to be effective used as an advertising medium.

SUMMARY OF THE INVENTION

An object of the present invention is to provide an advertising method using Internet e-mail service, which pays a predetermined charge to users for viewing advertisements when the users who have signed in the service are provided with the Internet e-mail service transmitting e-mails including advertisements provided by advertisers, to thereby invite and display advertisements.

Another object of the present invention is to provide an advertising method using Internet e-mail service, which transmits advertisements included in e-mails to users who want to see them to prevent a flood of spam mails and develop a healthy e-mail culture.

A still another object of the present invention is to provide an advertising method using Internet chatting service, which pays a predetermined charge for viewing specific advertisements or banners to users when they use the chatting service.

To accomplish the objects of the present invention, there is provided an advertising method using Internet e-mail service constructed in such a manner that an advertisement of a specific advertiser is displayed on the ground of the main screen of the Internet e-mail service transmitted from an e-mail server or a part thereof, and a transmitting part of the Internet e-mail having the advertisement displayed on the main screen thereof sends the e-mail to a receiving part. Upon confirmation of reception of the e-mail, a predetermined charge is paid to the transmitting part and receiving part. The advertisement displayed on the e-mail screen is selectively activated to allow the users (transmitting part and receiving part) to view it only when they want to see it and the predetermined charge is paid to them only when they see the advertisement. A variety of advertisements may be displayed on the e-mail screen to allow the transmitting part to be able to select.

In addition, the advertising method using Internet chatting service is constructed in such a manner that company advertisements and/or company banner advertisements are inserted in the ground or a specific portion of the chatting window displayed as the initial screen of each chatting participant, other than the input window through which conversations are carried out, and when the participants view the advertisements during chatting a predetermined charge is paid to them.

To accomplish the objects of the present invention, there is provided an advertising method using Internet e-mail system having a transmitting part's client PC for a transmitting part to transmit e-mails, a receiving part's client PC for a receiving part to receive the e-mails, an e-mail server and an Internet network for connecting the transmitting part's client PC, the receiving part's client PC and the e-mail server with one another, the method comprising the steps of the transmitting part sending an e-mail including an advertisement from the transmitting part's client PC to the receiving part's client PC, the advertisement being converted from an inactivated state to an activated state to be included in the e-mail; delivering information on the transmission of the e-mail from the transmitting part's client PC to the e-mail server, to record it therein; the receiving part receiving the e-mail including the advertisement using the receiving part's client PC; the receiving part selectively activating the advertisement included in the e-mail to see it; transmitting information on viewing of the advertisement from the receiving part's client PC to the e-mail server, to record it therein; and the e-mail server compensating the transmitting and receiving parts for viewing the advertisement on the basis of the information on the transmission of the e-mail and the information on viewing of the advertisement.

According to another aspect of the present invention, there is provided an advertising method using Internet e-mail system having a transmitting part's client PC for a transmitting part to transmit e-mails, a receiving part's client PC for a the receiving part to receive the e-mails, an e-mail server and an Internet network for connecting the transmitting part's client PC, the receiving part's client PC and the e-mail server with one another, the method comprising the steps of: the transmitting part sending an e-mail including an advertisement from the transmitting part's client PC to the receiving part's client PC, the advertisement being inserted in the ground of the e-mail main screen or a part of it; delivering information on the transmission of the e-mail from the transmitting part's client PC to the e-mail server, to record it therein; the receiving part receiving the e-mail including the advertisement using the receiving part's client PC; transmitting information on the reception of the e-mail from the receiving part's client PC to the e-mail server, to record it therein; and the e-mail server compensating the transmitting and receiving parts on the basis of the information on the transmission of the e-mail and the information on the reception of the e-mail.

According to still another aspect of the present invention, there is provided an advertising method using Internet e-mail system having a transmitting part's client PC for a transmitting part to transmit e-mails, a receiving part's client PC for a receiving part to receive the e-mails, an e-mail server and an Internet network for connecting the transmitting part's client PC, the receiving part's client PC and the e-mail server with one another, the method comprising the steps of the transmitting part downloading an e-mail including an advertisement from the e-mail server and adding messages he/she wants to send thereto; the transmitting part sending the e-mail including the advertisement from the transmitting part's client PC to the e-mail server, the advertisement being converted from an activated state to an inactivated state to be included in the e-mail; the e-mail server transmitting the e-mail to the receiving part's client PC, and storing information on the transmission of the e-mail therein; the receiving part receiving the e-mail including the advertisement using the receiving part's client PC; the receiving part selectively activating the advertisement included in the e-mail to view it; transmitting information on viewing of the advertisement from the receiving part's client PC to the e-mail server, to record it therein; and the e-mail server compensating the transmitting and receiving parts for viewing the advertisement on the basis of the information on the transmission of the e-mail and the information on viewing of the advertisement.

According to yet another aspect of the present invention, there is provided an advertising method using Internet e-mail system having a transmitting part's client PC for a transmitting part to transmit e-mails, a receiving part's client PC for a receiving part to receive the e-mails, an e-mail server and an Internet network for connecting the transmitting part's client PC, the receiving part's client PC and the e-mail server with one another, the method comprising the steps of the transmitting part downloading an e-mail including an advertisement from the e-mail server and adding messages he/she wants to send thereto; the transmitting part sending the e-mail including the advertisement from the transmitting part's client PC to the e-mail server, the advertisement being inserted in the ground of the e-mail main screen; the e-mail server transmitting the e-mail to the receiving part's client PC, and storing information on the transmission of the e-mail therein; the receiving part receiving the e-mail including the advertisement using the receiving part's client PC; transmitting information on the reception of the e-mail from the receiving part's client PC to the e-mail server, to record it therein; and the e-mail server compensating the transmitting and receiving parts on the basis of the information on the transmission of the e-mail and the information on the reception of the e-mail.

The kind, contents and form of the advertisement are chosen by the transmitting part. The advertisement includes one or more of a lottery ticket, a gift certificate and a free gift.

Each of the advertising methods further comprises the step of, when the e-mail is confirmed to be a spam mail, depriving the transmitting part sending the spam mail of his/her membership or paying no compensation money to him/her, the compensation money being for compensating the transmitting part for viewing the advertisement, and being saved up previously.

The advertising method may further comprises the step of the transmitting part downloading an e-mail including an advertisement from the e-mail server and adding message he/she wants to send thereto, before the step of sending the e-mail including the advertisement.

The information on the transmission of the e-mail is automatically transmitted from the transmitting part's client PC to the e-mail server, and the information on viewing of the advertisement is automatically transmitted from the receiving part's client PC to the e-mail server.

The information on the transmission of the e-mail is automatically transmitted from the transmitting part's client PC to the e-mail server, and the information on the reception of the e-mail is automatically transmitted from the receiving part's client PC to the e-mail server.

To accomplish the objects of the present invention, there is also provided an advertising method using Internet chatting service, wherein a company advertisement and/or company banner advertisement is inserted in the ground or a specific portion of a chatting window, other than an input window through which conversations are carried out, and a predetermined charge is paid to a chatting service user when he/she sees the advertisement, the chatting window being displayed as the initial screen of each chatting participant.

According to the present invention, as described above, when advertisements supplied by their advertisers are included in the e-mail to be transmitted while the Internet e-mail service is provided to the users who have signed in the service or those who want to sign in the service, a predetermined amount of charge is paid to them, to invite advertisements. Further, the advertisements are also displayed on the chatting window in the Internet chatting service to attain the same effect. Moreover, advertisements included in the e-mail are viewed to only those who want to see them, to prevent a flood of spam mails and develop a healthy e-mail culture. Additionally, a variety of events are performed to promote advertisements.

DETAILED DESCRIPTION OF THE PREFERRED EMBODIMENT

A preferred embodiment of the present invention is described in detail in the following with reference to the drawings.

The present invention provides an advertising method using Internet e-mail service to pay a predetermined amount of charge to both of transmitting and receiving parts when the transmitting part sends an e-mail including advertisements to the receiving part, to thereby improve advertising effect and prevent an unnecessary flood of spam mails.

In the advertising method of the present invention, in case where a user who has signed in Internet e-mail service and given an e-mail account sends an e-mail, for example, an advertisement of a specific advertiser is displayed on a part of the Internet e-mail screen transmitted from an e-mail server and, when the user sends as the transmitting part the e-mail containing the advertisement displayed on the screen thereof to a receiving part who also has signed in the e-mail service, a predetermined charge is paid to the transmitting and receiving parts.

In addition, in case of sending an e-mail message by a user who has not signed in the e-mail service, when he/she accesses the e-mail server to select the Internet e-mail having a specific advertisement displayed on the screen thereof and sends the e-mail to a receiving part through the e-mail server, a predetermined charge is paid to the transmitting and receiving parts (only if they are subscribers who have signed in the service). Moreover, the advertisement included in the e-mail is selectively activated to allow the users to view it when they want to see it and the predetermined charge is paid them only when they view the advertisement.

The e-mail service may be used employing a dedicated program produced by the e-mail service company or e-mail transmission/reception functions of an Internet browser such as Netscape or Internet explorer, currently widely being used.

Figure 1:
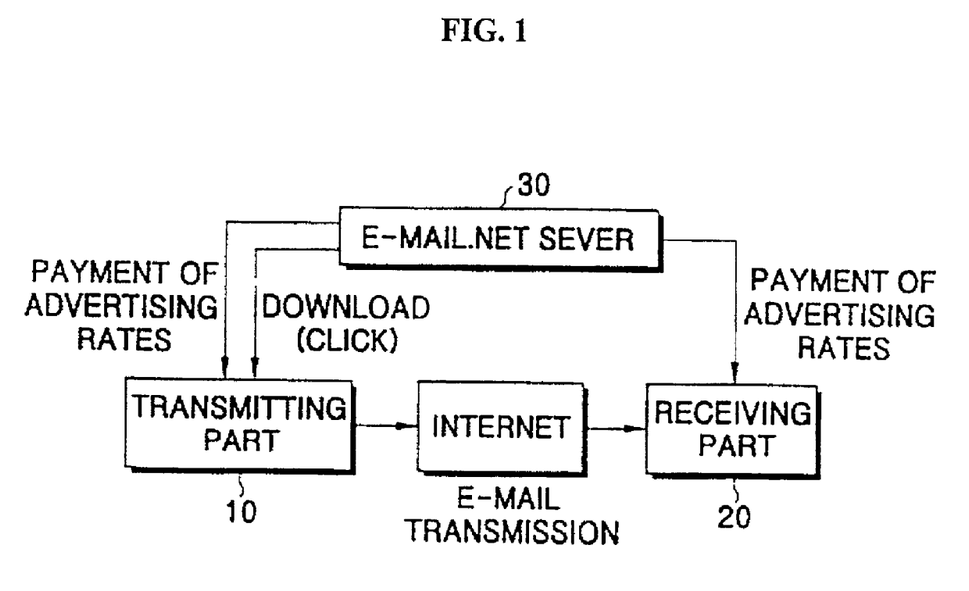
FIG. 1 roughly shows a method of transmitting/receiving e-mails between users who have signed in Internet e-mail service.
Figure 2:
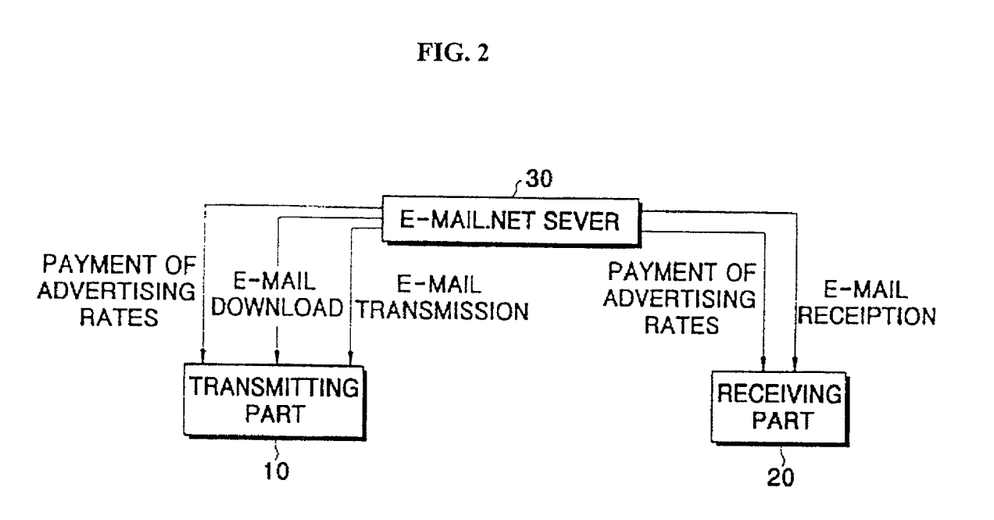
FIG. 2 roughly shows a method of transmitting/receiving e-mails between users who have not signed in Internet e-mail service yet.

FIG. 1 shows a method of transmitting/receiving e-mails between users who have signed in the Internet e-mail service, and FIG. 2 shows a method of transmitting/receiving e-mails between users who have not signed in the service. A transmitting part 10 who has signed in the service accesses the Internet using his/her Internet service provider (ISP) to receive an e-mail page from e-mail server 30. This e-mail page include one or more advertisements of specific advertisers and the transmitting part 10 adds messages he/she wants to send thereto. Each e-mail page contains one or more advertising contents and the transmitting part 10 can download an e-mail page including an advertisement he/she wants to see and adds messages thereto.

The e-mails used in the present invention can include a variety of advertising contents. For example, the e-mails are classified as A, B, C, D, E, F, . . . , which are selectable, e-mail A displaying an advertisement of a company A, e-mail B displaying an advertisement of a company B and e-mail C displaying an advertisement of a company C and so on, and the transmitting part selects his/her preferred e-mail among them to thereby choose an advertisement of a specific company. This may be stored as a database for a company that netizens prefer, to be used for a sales strategy.

When the user downloads one of e-mails A, B, C, D and E including the advertisement of a specific company, the e-mail service company records the downloaded state. Then, whenever the user sends an e-mail as the transmitting part 10, this transmission status is automatically recorded in the e-mail service company. The e-mail service company confirms the transmission state of the e-mail including a specific advertisement on the basis of the record, and then confirms the transmission record of the e-mail including the advertisement once in a month or week. Subsequently, the e-mail service company pays a predetermined charge (for viewing the advertisement) on the account of the transmitting part 10.

The receiving part 20 who has received the e-mail including the advertisement views the contents of the advertisement while confirming the e-mail message. Here, when the receiving part 20 sees the advertisement, this is transmitted to the e-mail service company through the Internet to be recorded therein. This can be accomplished using functions of the browser or functions of e-mail service program. The e-mail service company confirms reception state of the e-mail including the specific advertisement on the basis of the record thereof, and then confirms the transmission record of the e-mail including the advertisement once in a month or week. Subsequently, the e-mail service company pays the predetermined charge (for viewing the advertisement) on the account of the receiving part 20. The advertising rate is paid by its advertiser.

FIG. 2 shows the advertising method of the present invention in case of a user who has no address of the e-mail service company. In this case, the transmitting part 10 should sign in the e-mail service for receiving the charge for viewing advertisements and be in state of connecting to the e-mail server 30 for accurate statistics. In this state, the transmitting part 10 downloads the e-mail page including advertisements from the e-mail server and adds necessary contents thereto to send it through the e-mail server 30. Here, the e-mail can be transmitted with the address of the e-mail server 30 as the transmitting part's address and the Internet e-mail address of a receiving part (actual recipient), for example. Otherwise, a program is constructed to automatically record the e-mail address of the e-mail server in an advertising e-mail form to allow the e-mail with the advertisements to be able to be automatically transmitted to the receiving part. While both the transmitting and receiving parts 10 and 20 receive the charge for viewing advertisements when they have signed in the e-mail service, only the transmitting part 10 receives it when they have not.

The e-mail is first sent to the e-mail server where the transmitting part's address is deleted, and then transmitted to the Internet address of the recipient. In this case, there is no need to pay the charge for viewing advertisements to the receiving part 20. It is required for the receiving part to sign in the e-mail service for receiving the charge. Furthermore, by way of precaution against a case that the transmitting part sends an e-mail to unknown users for the purpose of acquiring the advertising charge, a spam mail confirmation section is placed, the service company records, when the receiving part clicks the spam mail confirmation section, this and deprives the corresponding transmitting part of his/her membership or does not pay the advertising charge to him/her.

Figure 3:
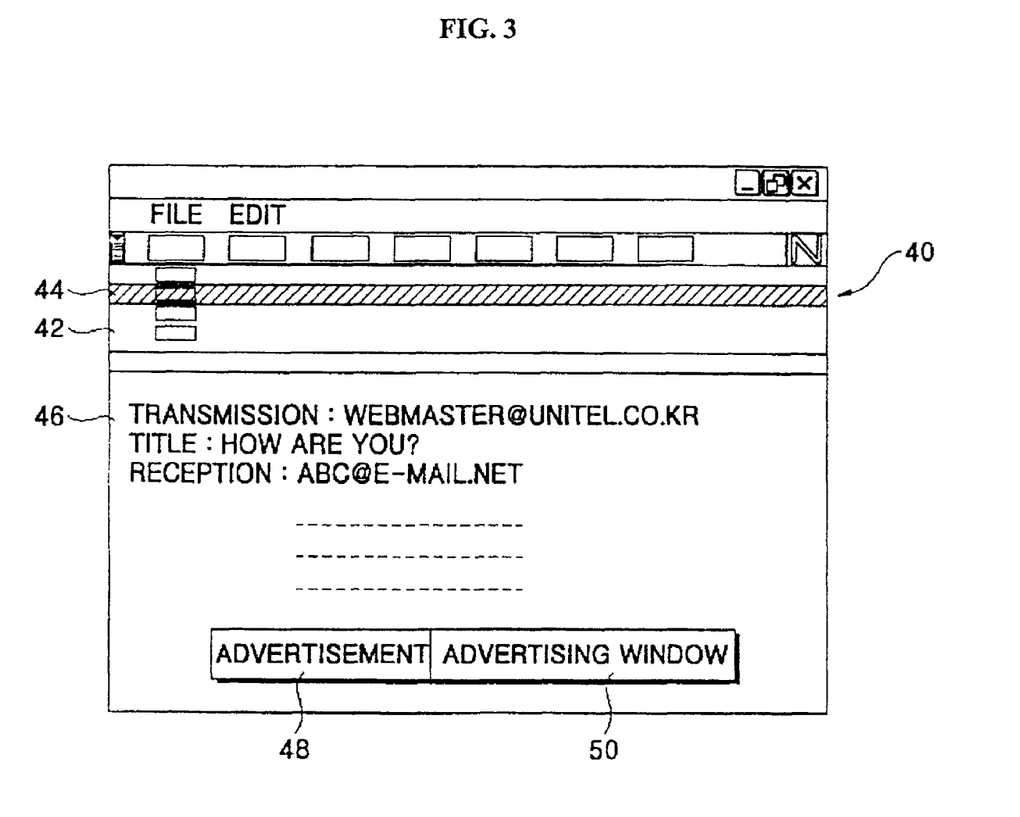
FIG. 3 shows an embodiment of an e-mail window including an advertisement.
Figure 4:
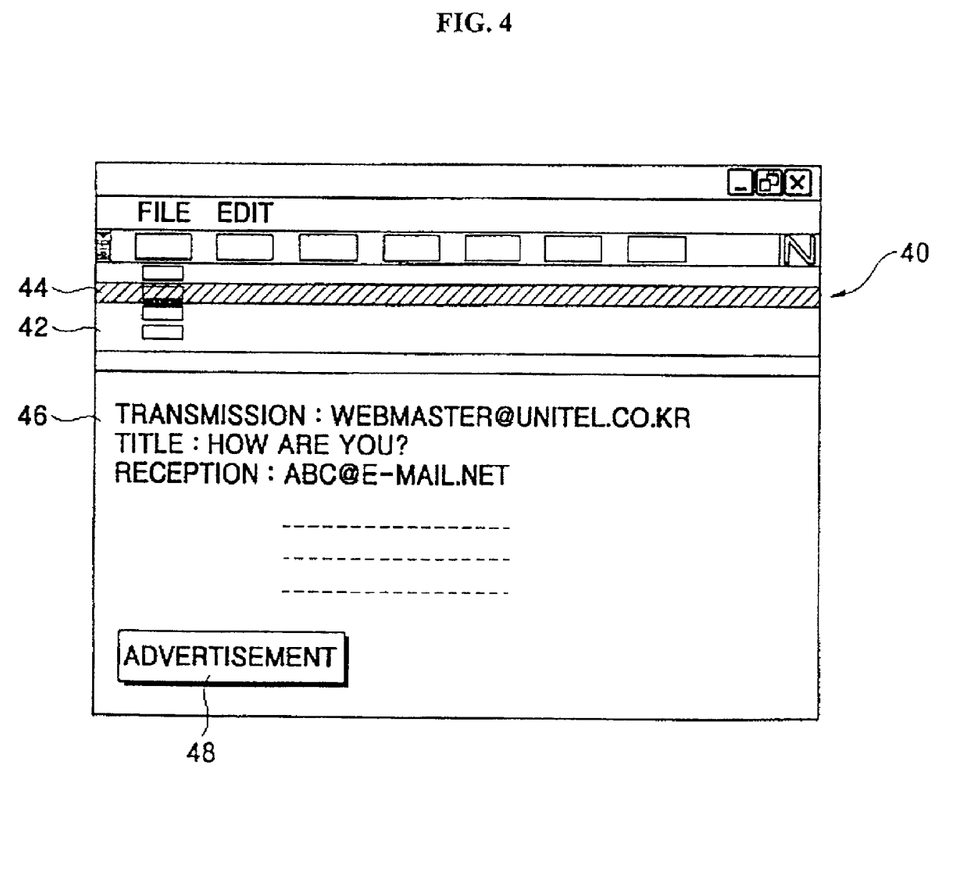
FIG. 4 shows an embodiment of an e-mail window including no advertisement.

FIGS. 3 and 4 show examples of e-mails used in the advertising method of the present invention, FIG. 3 illustrating that an advertisement is inserted in the lower part of e-mail mail screen, to be activated and FIG. 4 illustrating that the e-mail is in inactivated state. Here, Netscape's navigator is used as a browser 40 for reading e-mail messages. Referring to FIGS. 3 and 4, upon selection of a received mail a user wants to read from a received mail list window 42 displaying multiple received mail lists, the contents of the selected mail are displayed in an e-mail text box 46 located under the received mail list window 42. The displayed contents include the transmitting part's address, title, receiving part's address, and the text of the mail. In addition, an advertising window 50 on which a specific advertisement is displayed is inserted in a predetermined portion of the screen. An advertisement selected from a variety of advertisements by the transmitting part 10 is displayed on the advertising window 50.

By way of precaution against a case where the users do not want to see the advertisement or the transmitting part wants to inactivate it by courtesy, an advertisement menu selection button may be set at one side of the advertising window 50.

FIG. 4 shows the inactivated state of the advertising window. In this case, advertising window 50 is not displayed. When the transmitting part 10 sends an e-mail while pushing the advertisement menu selection button 48 to inactivate the advertising window 50, the receiving part 20 may push the advertisement menu selection button 48 to see the advertisement or ignore it after reception of the e-mail.

It is obvious to those related with the art that advertisements may be textual or may be realized in various forms using multimedia employing a program such as java. For example, the advertisement may display only the logo of a corresponding advertiser or be configured in such a manner that, when the logo is clicked while being displayed, advertising text other than questionnaires or the company logo can be seen. In FIG. 3, though only one advertising window 50 is displayed, more than one advertisement can be inserted in a single e-mail to be displayed. Here, the advertisements may be provided by the same company or different companies. This is especially effective when advertising rates are required to decrease.

Figure 5:
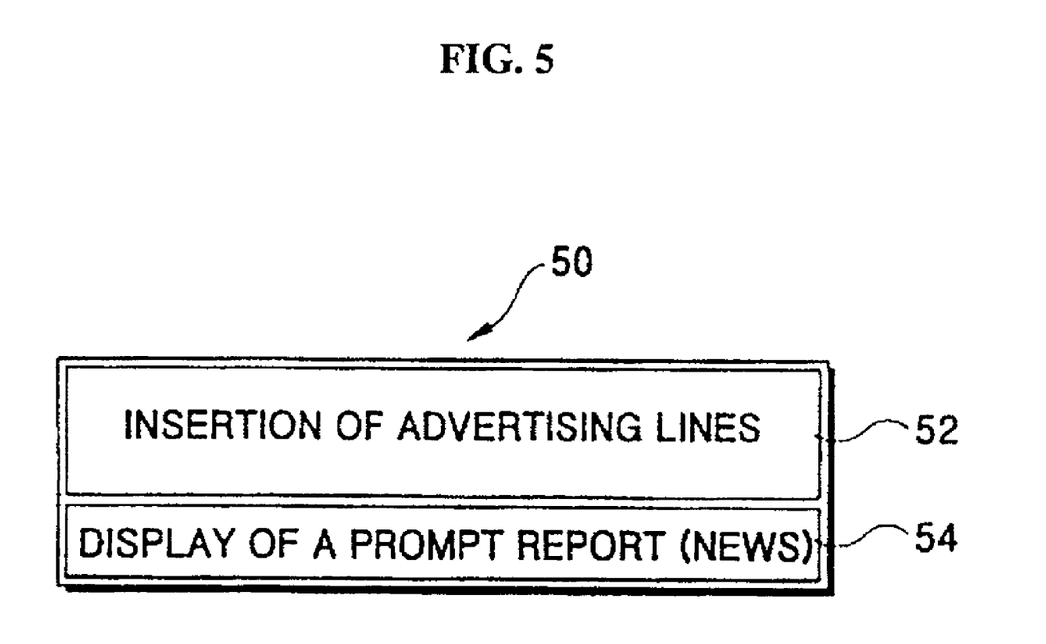
FIG. 5 roughly shows an example of an advertising window for displaying advertising contents.

Moreover, a maxim or news may be inserted in a part of the advertising window 50, as shown in FIG. 5, to improve applications of advertisement and provide information useful for living, increasing probability of viewing advertisements. Additionally, to increase the rate of viewing advertisements of recipients, for example, an event may be employed that a lottery ticket is provided in the advertisements to offer a premium such as prize or goods.

The advertising method according to the present invention can be applied to chatting service. Specifically, in free chatting service provided to users, which is one of the most frequently used services, an advertisement is inserted in the ground of the chatting window or a part thereof and users are under an obligation to see it. Otherwise, the advertisement is activated to be displayed when it is clicked, clicking state is recorded, and then the record is counted once in a month or week to pay a predetermined charge to the users. The payment of the charge is performed free or in membership system, which is the same as the advertising method using the e-mail.

While the invention has been described in terms of several preferred embodiments, those skilled in the art will recognize that the invention can be practiced with modification within the spirit and scope of the appended claims.

What is claimed is:

1. An advertising method using Internet e-mail system having a transmitting part's client PC for a transmitting part to transmit e-mails, a receiving part's client PC for a receiving part to receive the e-mails, an e-mail server and an Internet network for connecting the transmitting part's client PC, the receiving part's client PC and the e-mail server with one another, the method comprising the steps of:
    the transmitting part sending an e-mail including an advertisement from the transmitting part's client PC to the receiving part's client PC, wherein the advertisement included in the e-mail is convertible between an inactivated state and an activated state, and vice versa, by an activating member provided separately from the advertisement and also included in the email;
    delivering first information on the transmission of the e-mail from the transmitting part's client PC to the e-mail server, and recording the first information in the e-mail server;
    the receiving part receiving and opening the e-mail including the advertisement using the receiving part's client PC, wherein, when the email is received and opened by the receiving part, the advertisement, the activating member and a body of said email are displayed together in an email main screen, and wherein the advertisement displayed in the email main screen is hidden from being viewed in said email main screen upon activation of said activating member;
    transmitting second information on viewing of the advertisement from the receiving part's client PC to the e-mail server, and recording the second information in the e-mail server; and
    configuring the e-mail server to compensate the transmitting and receiving parts for viewing the advertisement on the basis of the first and second information.

2. The method as claimed in claim 1, wherein the advertisement included in the e-mail is chosen by the transmitting part among a plurality of advertisements presented by the e-mail server to the transmitting part.

3. The method as claimed in claim 1, wherein the advertisement includes a lottery ticket.

4. The method as clamed in claim 1, further comprising either preventing the transmitting part from sending a spam mail of a membership or paying no compensation money to a member having the membership, the compensation money being for compensating the transmitting part for viewing the advertisement, the compensation money being saved up previously.

5. The method as claimed in claim 1, wherein the first information on the transmission of the e-mail is automatically transmitted from the transmitting part's client PC to the e-mail server, and the second information on viewing of the advertisement is automatically transmitted from the receiving part's client PC to the e-mail server.

6. An advertising method using Internet e-mail system having a transmitting part's client PC for a transmitting part to transmit e-mails, a receiving part's client PC for a receiving part to receive the e-mails, an e-mail server and an Internet network for connecting the transmitting part's client PC, the receiving part's client PC and the e-mail server with one another, the method comprising the steps of:
    the e-mail server presenting a plurality of e-mail pages, each of which includes an advertisement, to the transmitting part;
    the transmitting part selecting one e-mail page among the plurality of e-mail pages;
    the transmitting part downloading the selected e-mail page and the included advertisement from the e-mail server, and adding messages he/she wants to send to the selected and downloaded email page to compose an email;
    the transmitting part sending the e-mail and the included advertisement from the transmitting part's client PC to the e-mail server, wherein the advertisement included in the e-mail is convertible between an inactivated state and an activated state;
    the e-mail server transmitting the e-mail to the receiving part's client PC, and storing first information on the transmission of the e-mail;
    the receiving part receiving and opening the e-mail and the included advertisement using the receiving part's client PC, wherein, when the email is received and opened by the receiving part, the advertisement, an activating member and a body of said email are displayed together in an email main screen, and wherein the advertisement displayed in the email main screen is hidden from being viewed in said email main screen upon activation of said activating member;
    transmitting second information on viewing of the advertisement from the receiving part's client PC to the e-mail server, and recording the second information in the e-mail server; and
    the e-mail server compensating the transmitting and receiving parts for viewing the advertisement on the basis of the first and second information.

7. An advertising method using Internet e-mail system having a transmitting part's client PC for a transmitting part to transmit e-mails, a receiving part's client PC for a receiving part to receive the e-mails, an e-mail server and an Internet network for connecting the transmitting part's client PC, the receiving part's client PC and the e-mail server with one another, the method comprising the steps of:
    the e-mail server presenting a plurality of e-mail pages, each of which includes an advertisement, to the transmitting part;
    the transmitting part selecting one e-mail page among the plurality of e-mail pages;
    the transmitting part downloading the selected e-mail page and the included advertisement from the e-mail server, and adding messages he/she wants to send to the selected and downloaded email page to compose an email;

the transmitting part sending the e-mail and the included advertisement from the transmitting part's client PC to the e-mail server;

the e-mail server transmitting the e-mail to the receiving part's client PC, and storing first information on the transmission of the e-mail;

the receiving part receiving and opening the e-mail and the included advertisement using the receiving part's client PC, wherein, when the email is received and opened by the receiving part, the advertisement, an activating member and a body of said email are displayed together in an email main screen, and wherein the advertisement displayed in the email main screen is hidden from being viewed in said email main screen upon activation of said activating member;

transmitting second information on the reception of the e-mail from the receiving part's client PC to the e-mail server, and recording the second information in the e-mail server; and the e-mail server compensating the transmitting and receiving parts for viewing the advertisement on the basis of the first and second information.

8. An advertising method using Internet e-mail system having a transmitting part's client PC for a transmitting part to transmit e-mails, a receiving part's client PC for a receiving part to receive the e-mails, an e-mail server and an Internet network for connecting the transmitting part's client PC, the receiving part's client PC and the e-mail server with one another, the method comprising the steps of:

the transmitting part sending an e-mail including an advertisement from the transmitting part's client PC to the receiving part's client PC, wherein the advertisement included in the e-mail is convertible between an inactivated state and an activated state by an activating member provided separately from the advertisement and also included in the email;

delivering information on the transmission of the e-mail from the transmitting part's client PC to the e-mail server, to record it therein;

the receiving part receiving and opening the e-mail including the advertisement using the receiving part's client PC;

transmitting information on viewing of the advertisement from the receiving part's client PC to the e-mail server, to record it therein; and configuring the e-mail server to compensate the transmitting and receiving parts for viewing the advertisement on the basis of the information on the transmission of the e-mail and the information on viewing of the advertisement;

the method further comprising:

displaying the activating member and a body of said email together with the advertisement in an email main screen when the email is received and opened by the receiving part; and in response to the receiving part's activation of the activating member, either switching the advertisement from the activated state to the inactivated state and hiding the advertisement from being viewed in said email main screen.

9. The method as claimed in claim 8, wherein said activating member is a clickable button.

* * * * *